US012715078B2

(12) United States Patent
Cucchi

(10) Patent No.: US 12,715,078 B2
(45) Date of Patent: Aug. 25, 2026

(54) SELF-CENTERING DEVICE FOR SUPPORTING AND GUIDING BARS

(71) Applicant: CUCCHI GIOVANNI & C. S.r.l., Bussero (IT)

(72) Inventor: Cesare Cucchi, Bussero (IT)

(73) Assignee: CUCCHI GIOVANNI & C. S.r.l., Bussero (IT)

( * ) Notice: Subject to any disclaimer, the term of this patent is extended or adjusted under 35 U.S.C. 154(b) by 711 days.

(21) Appl. No.: 18/247,517

(22) PCT Filed: Oct. 1, 2021

(86) PCT No.: PCT/IB2021/059036
§ 371 (c)(1),
(2) Date: Mar. 31, 2023

(87) PCT Pub. No.: WO2022/070152
PCT Pub. Date: Apr. 7, 2022

(65) Prior Publication Data

US 2023/0373009 A1 Nov. 23, 2023

(30) Foreign Application Priority Data

Oct. 2, 2020 (IT) ........................ 102020000023320

(51) Int. Cl.
*B23Q 7/00* (2006.01)
*B23Q 7/04* (2006.01)

(52) U.S. Cl.
CPC .................................... *B23Q 7/042* (2013.01)

(58) Field of Classification Search
CPC ............... B23B 13/126; Y10T 82/2518; Y10T 82/2571; B23Q 1/766; B23Q 7/042; B23Q 7/043
See application file for complete search history.

(56) References Cited

FOREIGN PATENT DOCUMENTS

| | | | |
|---|---|---|---|
| EP | 0213659 | B1 | 1/1990 |
| EP | 0390919 | A1 | 10/1990 |
| EP | 0485902 | A1 | 5/1992 |
| EP | 0689890 | A1 | 1/1996 |
| GB | 2159735 | A | 12/1985 |
| WO | WO2019/166974 | A1 | 9/2019 |

*Primary Examiner* — Alan Snyder
(74) *Attorney, Agent, or Firm* — Laubscher & Fretwell, P.C.

(57) ABSTRACT

A self-centring device for supporting and guiding bars to be fed to a machine tool, including:

a guide body having a through opening, supported rotatably and rotating in a controlled manner around an axis perpendicular to an advancement direction of the bars to be guided, so as to vary the angular orientation thereof around the axis; the guide body is configured to receive and maintain in position the rotating and advancing bars, a return member configured to oppose a suitable preselectable resistance to the rotation of the guide body around the axis so as to maintain a firm coupling and contact of the guide body with the advancing bar, a manual selector member configured to adjust a position and control the angular movement of the guide body. The manual selector member includes a screw arrangement cooperating with an oscillation limiting element to set an angular rest position of the guide body in function of the geometry of the bar to be received and guided to said machine tool.

8 Claims, 7 Drawing Sheets

E
13
22
20
28
B, B2
14
D
α
36
26
24
26
17
13
28
22
B, B2
α2
E
14
D
26
24
20
26
22
38
17

96
20
16
24
92
94
95
E
90
91
10
B, B1

98
20
16
90
24
94
92
95
E
91
10
B, B2

SELF-CENTERING DEVICE FOR SUPPORTING AND GUIDING BARS

The present invention refers to a self-centring device for supporting and guiding bars that have to be fed to a spindle of a machine tool, both of the single-spindle and multi-spindle type.

BACKGROUND OF THE INVENTION

In the machine-tool sector, the use is known of devices for centring, supporting and guiding bars to be processed. These bars, during feeding for example to a spindle of a lathe, are subject to oscillations and shocks.

Centring devices have the function of trying to reduce oscillations and correct the positioning of these bars or, in general, metal semi-finished products of elongated shape such as tubes and the like.

Some embodiments of centring devices are known from EP0213659 and EP0485902, in the name of this applicant.

The high rotation speeds of modern lathes—which can reach values of tens of thousands of revolutions per minute and higher—mean that current centring devices are not particularly effective in the action of guiding and maintaining in an axially aligned position the bars that during feeding, are also rotated around their longitudinal axis.

In other words, the static centring action that is supplied by the aforesaid known devices appears to be very modest and insufficient to contrast the significant stress to which the bar is subjected because of minor eccentricities or flexure of the bar.

The inappropriate guiding and centring action leads to banging of the bar and often causes surface damage to the bar, in addition to causing high levels of wear and noise in the feeding system. Some solutions involve a guide bush, intended to receive the advancing bar internally.

The bar, generally rotating around its own longitudinal axis, comes into contact with the cylindrical surface of this bush, which acts to try to maintain the bar in a suitable position, axially aligned on the spindle of the machine tool.

The centring device, in particular the aforesaid bush, has to be able to support and guide bars having a different diameter. It is inconvenient and expensive, for various reasons, to replace the bush each time according to the diameter of the bar to be fed.

In order to meet this need, in the past, the present applicant proposed the centring device disclosed in EP0689890.

This known centring device includes an idling rotating annular guide element that is angularly orientable with respect to the bar.

The annular guide element is pushed to adhere to the bar in diametrically opposite points, orienting the bar by suitable actuators, and is rotated, exerting a dynamic centring action on the bar.

A similar centring device enables the problems of wear and noise caused by the knocking of the bars to be substantially reduced owing to the dynamic centring action on the bar; nevertheless, it is necessary to adjust each time the angular orientation of the annular guide element according to the diameter of the bars to be centred, thus requiring intervention by an operator. Then, this device has quite a complex construction and needs to be connected to a suitable supply source that is suitable for the operation of the actuators of the centring device.

The device that has just been described in moreover bulky and makes the structure heavy to which it is fitted, also adversely affecting the overall operation of the loading and supply system.

The great structural and functional complexity of this device inevitably also implies an unsatisfactory level of mechanical reliability and a general cost increase.

An example of centring device is known from EP0689890.

In the light of what has been set out above and in consideration of the associated limits described above, ample grounds for improvement of current centring devices for bars are found.

SUMMARY OF THE INVENTION

One object of the present invention is to improve current centring devices for bars to be fed to machine tools.

Another object of the present invention is to improve current centring devices by providing a self-centring device that is very versatile and easily adaptable to and couplable with available loading systems.

Another object of the present invention is to provide a lighter and more compact self-centring device.

Another object of the present invention is to provide a self-centring device that is very simplified both from the structural and functional point of view compared with current centring devices, which thus has greater mechanical reliability.

The above is achievable by a self-centring device according to what is defined in the claims.

Owing to the invention, the aforesaid drawbacks are overcome.

In particular, the device according to the invention, with a very simple structural configuration, enables great versatility to be conferred and the adaptability and efficacy of the apparatus to be improved.

BRIEF DESCRIPTION OF THE DRAWINGS

Further features and advantages will be clear from the following description, with reference to the figures, in which.

DETAILED DESCRIPTION OF THE INVENTION

Figure 1:
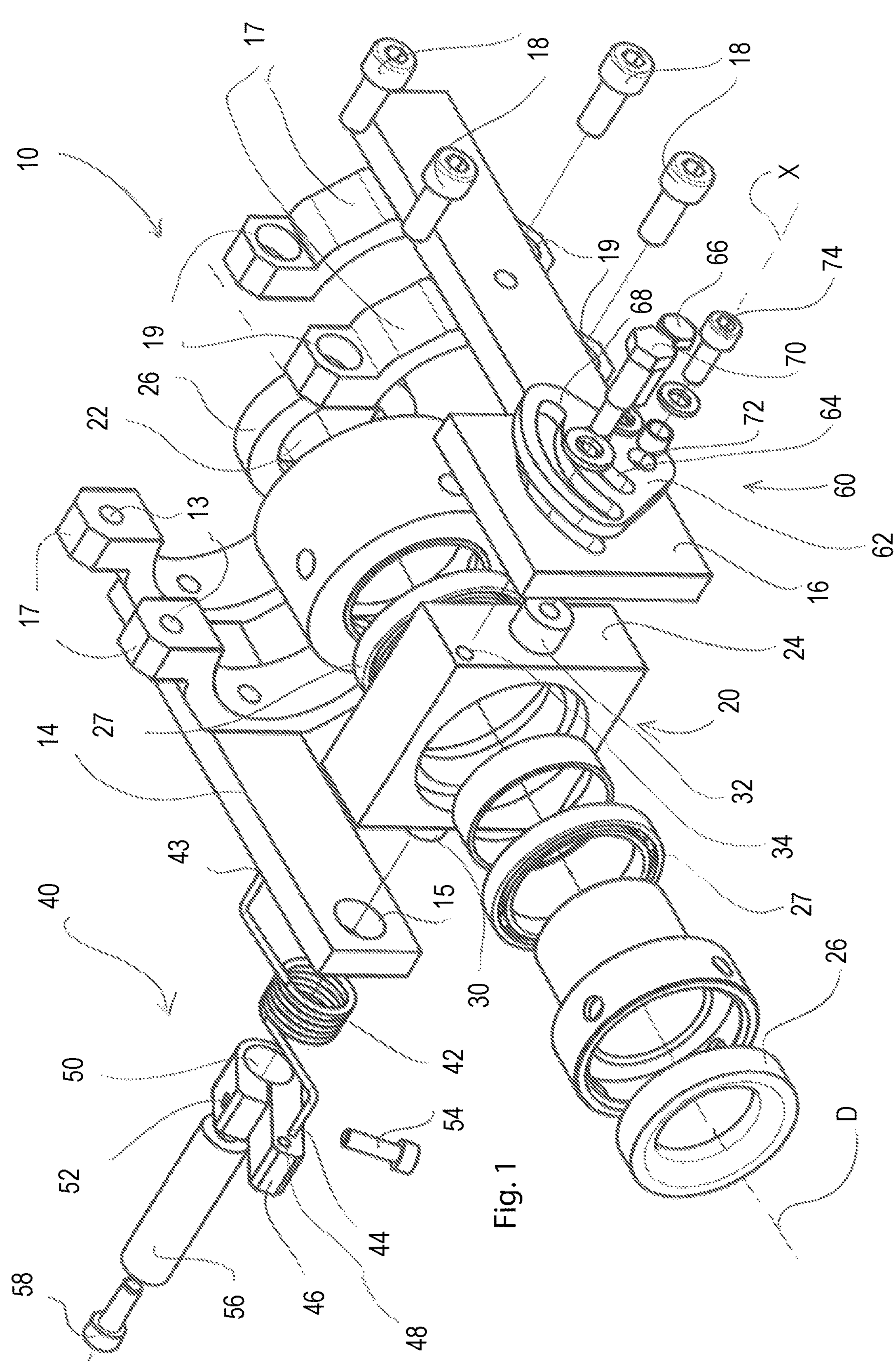
FIG. 1 is an exploded prospective view of the device according to the invention.
Figure 2:
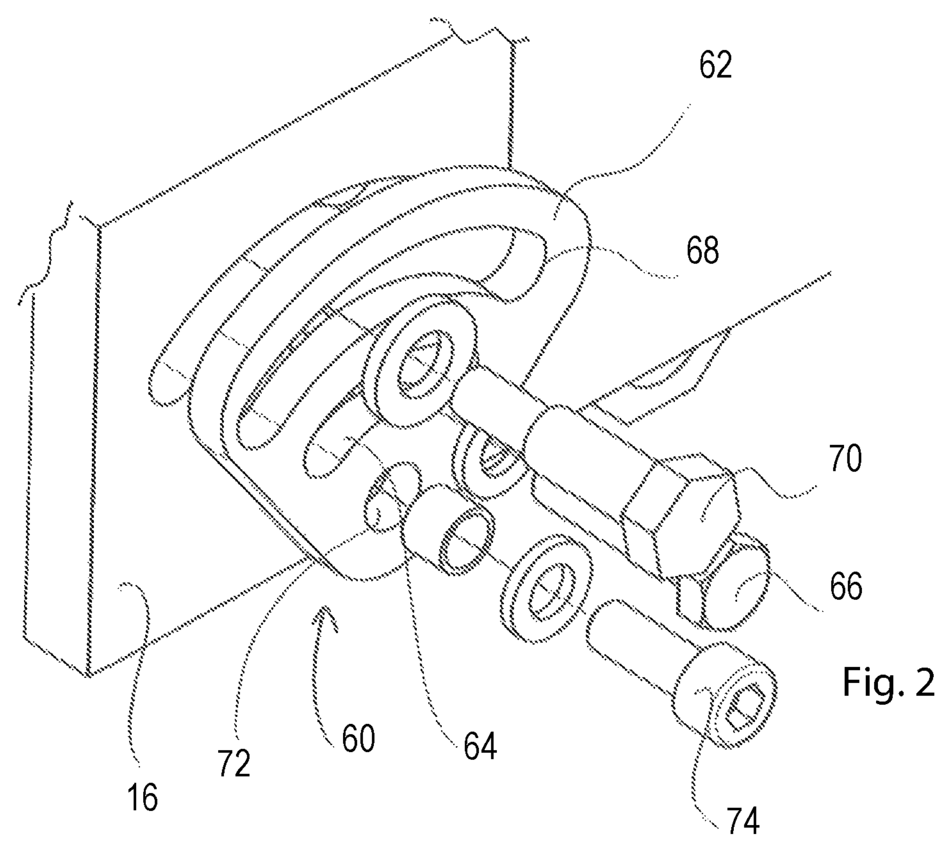
FIG. 2 shows a detail of FIG. 1.
Figure 3:
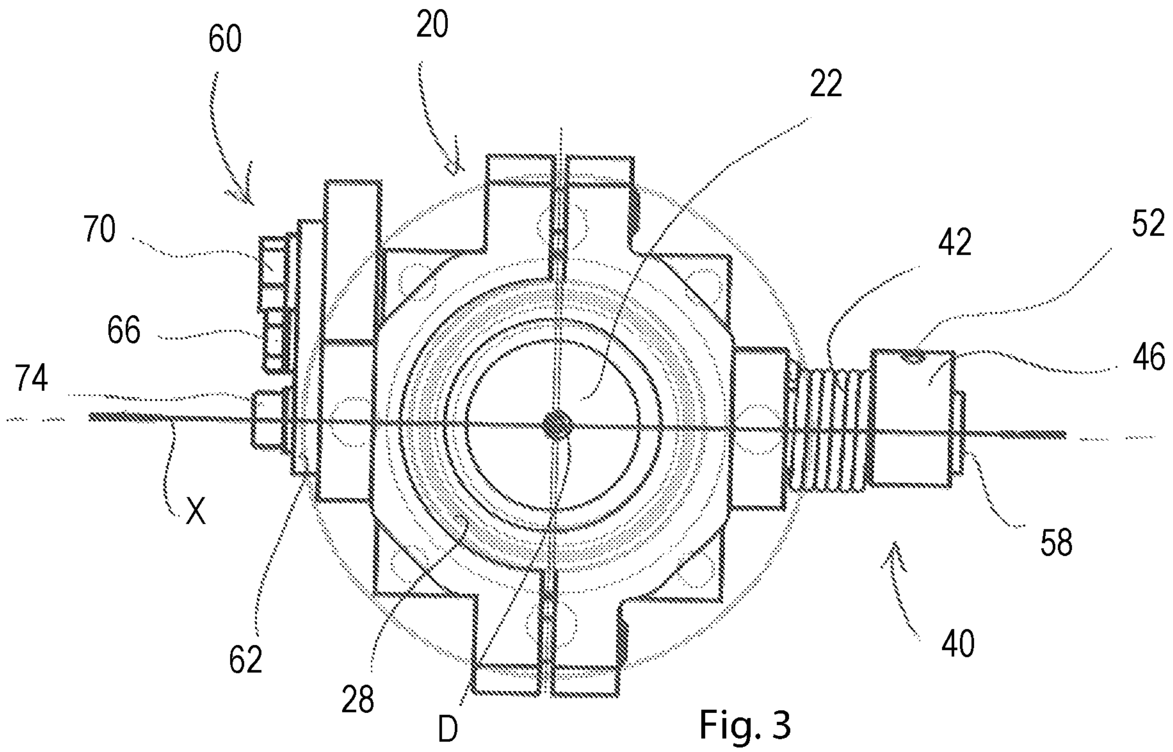
FIG. 3 is a rear view of the device according to the invention.
Figure 4:
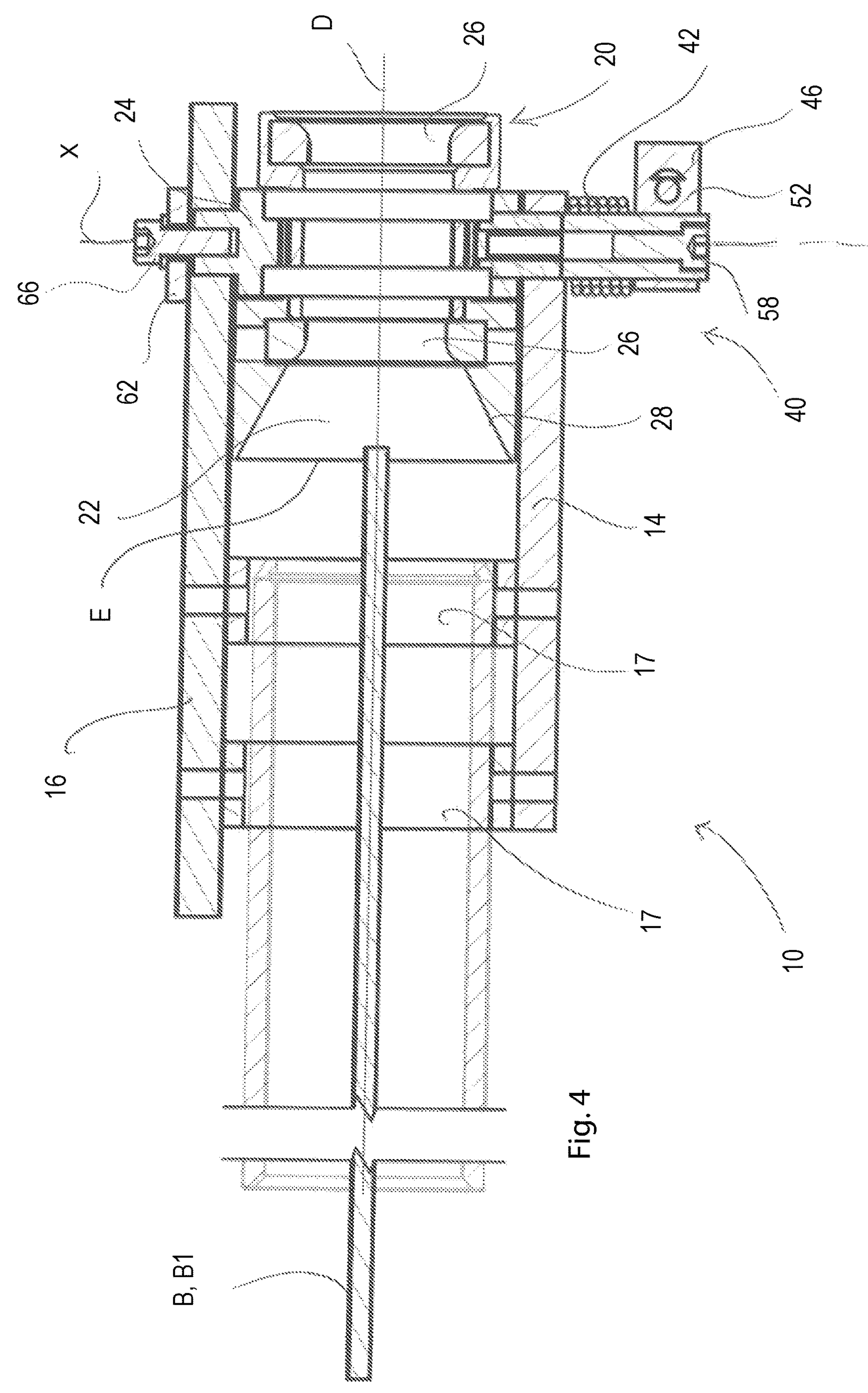
FIG. 4 shows a longitudinal section of the device according to the invention.

With reference to the appended figures, a self-centring device 10 for supporting and guiding bars B, B1, B2 to be fed to a machine tool, such as for example a lathe, is disclosed below with greater detail. Inside the text, we distinguish the generic bar B and the bars B1 and B2, the bar B1 having a lesser diameter than the diameter of the bar B2.

The self-centring device 10 is suitable for being fitted to bar-loading apparatuses, the function of which is that of supplying the bars to the aforesaid lathe.

The self-centring device 10 according to the invention includes a guide body 20, having a through opening 22 configured to receive and maintain in position the bars B,B1,B2 rotating and moving—along an advancement direction D—to the lathe. The supported guide body 20 is rotatably supported and rotates in a controlled manner around an axis X perpendicular to the advancement direction D of the bars B,B1,B2 to be guided, so as to adopt the appropriate angular orientation on the basis of the diameter of the latter.

More precisely, the guide body 20 includes a support structure 24, shaped to define the through opening 22, intended to permit the transit of the bars B,B1,B2 moving along the advancement direction D.

The through opening 22 is bounded by flared surfaces 28, obtained at one end E of the guide body 20; the bars B,B1,B2 penetrate through the end E, inside the through opening 22. The flared surfaces 28 are shaped to ease the entrance and containment of the bars B,B1,B2.

The guide body 20 further includes anti-friction elements 26, which define at least part of the inner surface that bounds said through opening 22. The function of the anti-friction elements 26, together with the ball bearings 27, is to reduce the friction in the reciprocal contact between the bar B,B1, B2 and guide body 20.

The self-centring device 10 also includes a return member 40 and a manual selector member 60;90, which control the angular movement of the guide body 20 around the aforesaid rotation axis X.

In particular, the return member 40 performs the function of moving the guide body 20 to an angular rest position before receiving a bar B,B1,B2. This process is necessary, as will be explained in more detail below, to perform a maintaining and centring function on the bars B,B1,B2 to be fed to the machine tool.

Both the return member 40, and the selector member 60;90 are fitted to a support structure 14,16, which is suitable for being fitted in turn to the bar-feeding apparatus. The support structure 14,16 is formed by a first bracket 14 and a second bracket 16. Both the first bracket 14 and the second bracket 16 are provided with coupling elements 17, cooperating to bound, once the brackets 14,16 have been mutually fixed, an advancement path of tubular shape for the bars B,B1,B2. Fixing the first bracket 14 to the second bracket 16 occurs by inserting screw members 18 inside holes 19 made in the coupling elements 17 of said second bracket 16. Once inserted, the screw members 18 are fixed in seats 13 obtained on the coupling elements 17 of the first bracket 14.

In one of the possible embodiments, which is visible in the attached figures, to the first bracket 14 the return member 40 is fitted, whereas the selector member 60;90 is fitted to said second bracket 16.

The return member 40 is configured to oppose suitable preselectable resistance to the rotation of the guide body 20 around the axis X, so as to maintain still coupling and contact between the guide body 20 and the advancing bar B,B1,B2.

The return member 40 includes an elastic element 42, configured to oppose a counter-rotation force to said guide body 20 to maintain the bar B,B1,B2 rotating in a correct position.

In particular, the elastic element 42 includes a helical torsion spring 42, having a first end 43 and a second end 44. The first end 43 engages in a stationary manner the support structure 14,16, in particular to the first bracket 14, whereas the second end 44 is operationally connected to the guide body 20, by a coupling and adjusting arrangement 46,56,58.

The coupling and adjusting arrangement 46,56,58 includes a hollow connecting element 56 and an adjusting arm 46 fitted to the hollow connecting element 56. The adjusting arm 46 is configured to select the size of the elastic return force exerted by the torsion spring 42. On the adjusting arm 46, a coupling seat 48 for the second end 44 of the spring 42 and a seat 52 housing a releasable fixing and adjusting screw 54 are obtained, by means of which it is possible to adjust the position of the adjusting arm 46 around the hollow connecting element 56, to increase or decrease in a desired manner the return force exerted by the torsion spring 42.

The hollow connecting element 56 extends through a through opening 50 obtained in the adjusting arm 46 and through the torsion spring 42. The hollow connecting element 56 is shaped to couple integrally, by a screw element 58, with a protrusion 30 of the guide body 20, which engages with a seat 15 of the support structure 14,16.

The manual selector member 60;90 is configured to adjust a position and control the angular movement of the guide body 20. More precisely, the manual selector member 60;90 includes a screw arrangement 66,70;92, which cooperates with an oscillation limiting element 62;94 to set an angular rest position 36 of the guide body 20, in function of the geometry of the bar B,B1,B2 to be received and guided to the machine tool.

According to a first embodiment, the limiting element included in the selector member 60 includes an adjusting plate 62, applied to the support structure 14,16, in particular on the second bracket 16. The plate 62 is configured to limit the oscillation of the guide body 20 around the axis X.

The adjusting plate 62 is further hinged on the support structure 14,16 by a screw element 74 that engages a respective hole 72.

The selector member 60 includes a positioning arrangement 64,66 to adjust the position of, and fix in a releasable manner, the adjusting plate 62 with respect to the support structure 14,16.

The positioning arrangement includes a setting screw 66 suitable for being coupled in a stationary manner with a hole obtained on said support structure 14,16. The screw 66 engages a setting slot 64 of arched shape, obtained on the adjusting plate 62. Once the setting screw 66 is loosened, the setting slot 64 enables the position of the adjusting plate 62 to be adjusted relatively to the support structure 14,16.

Further, on the adjusting plate 62 a sliding and limiting slot 68 is obtained cooperating with a cursor screw 70 connected to, and movable with, the guide body 20. The positioning of the adjusting plate 62 sets an angular rest position 36 of the guide body 20, as a function of the geometry of the bar B,B1,B2 to be received and guided to said machine tool. In turn, the sliding and limiting slot 68 imposes an end-stroke position on the cursor screw 70. The end-stroke position is variable by modifying the position of the adjusting plate 62 with respect to the support structure 14,16, acting on said positioning arrangement 64,66.

Figures 5, 6:
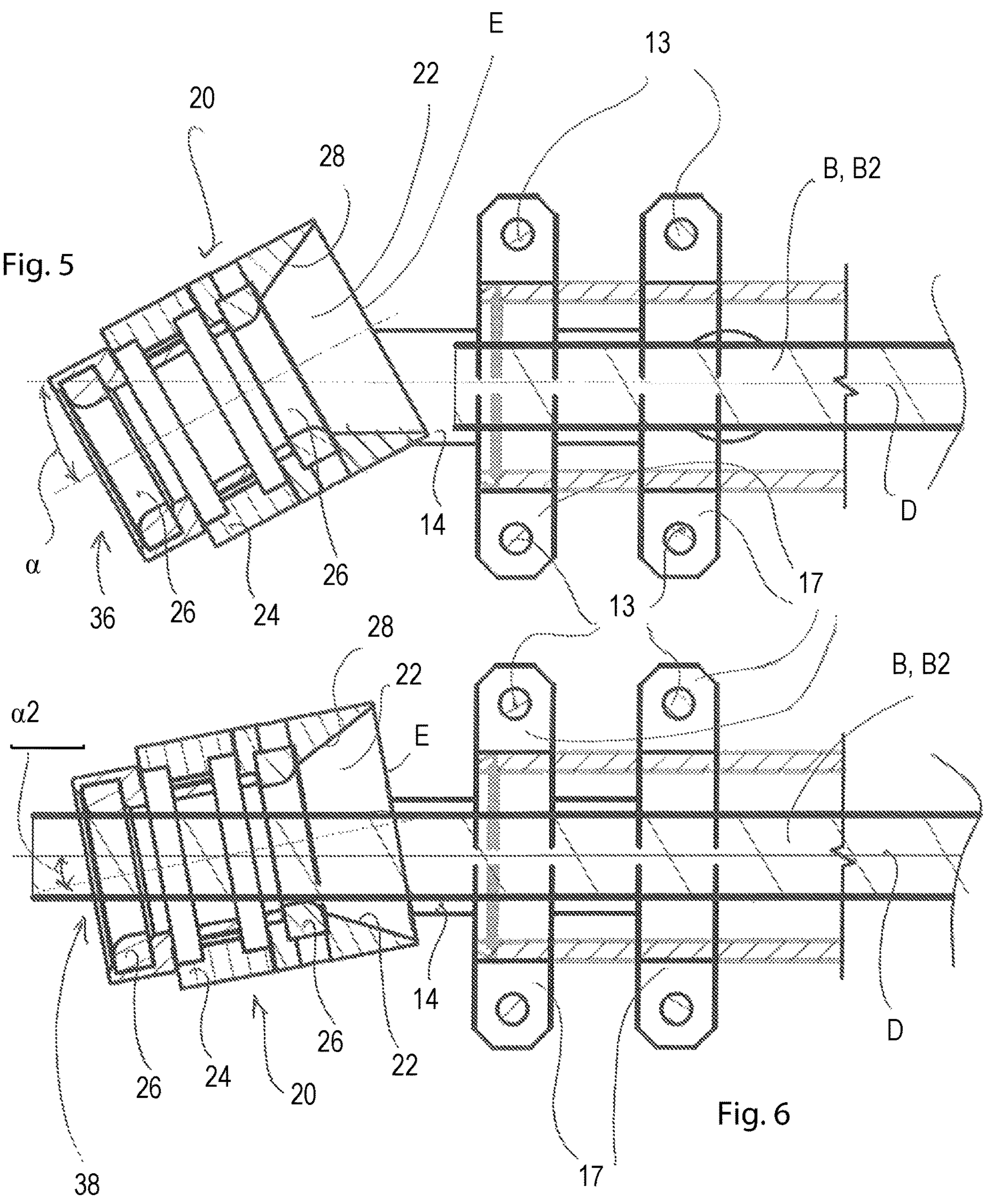
FIG. 5 is a longitudinal section of the device according to the invention in a rest position.
FIG. 6 is a longitudinal section of the device in an operating position in which it is coupled with a bar.
Figure 7:
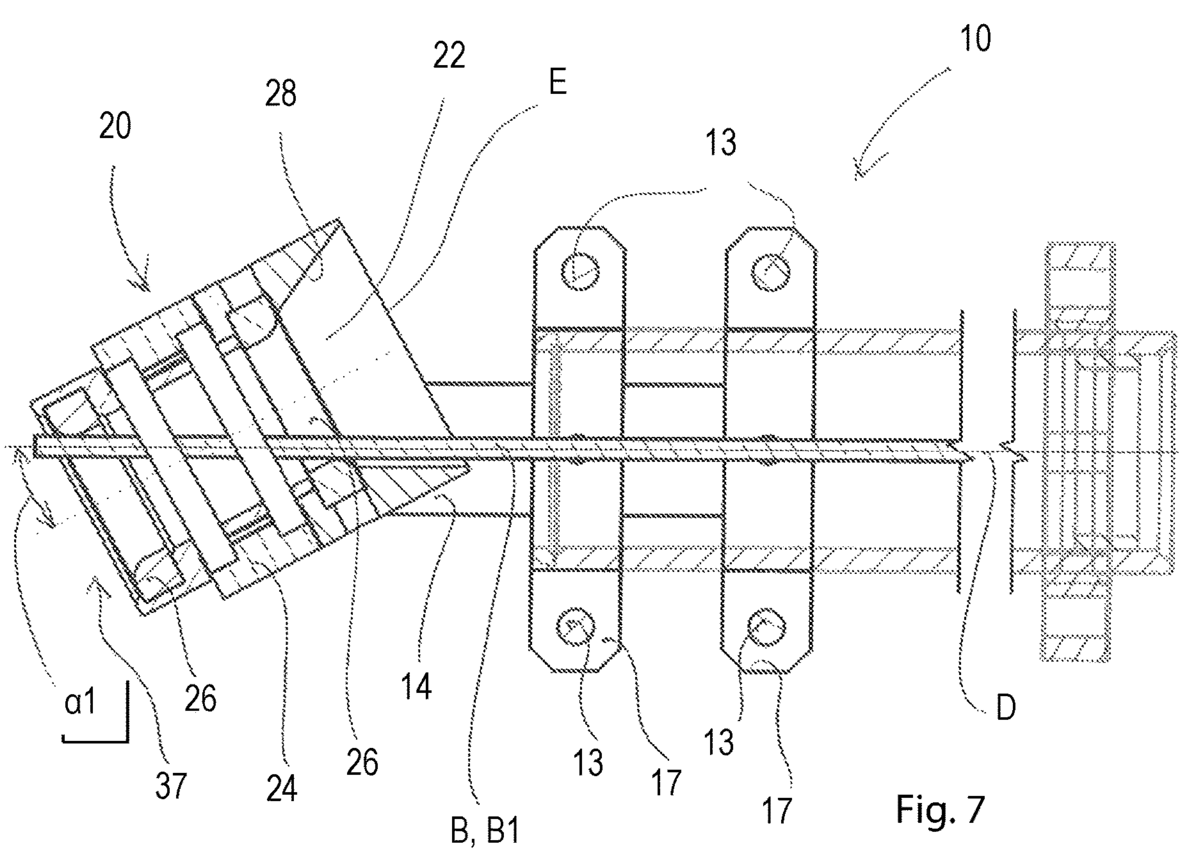
FIG. 7 is another longitudinal section of the device in a further operating position in which it is coupled with a bar of lesser diameter than in the case of FIG. 6.
Figure 8:
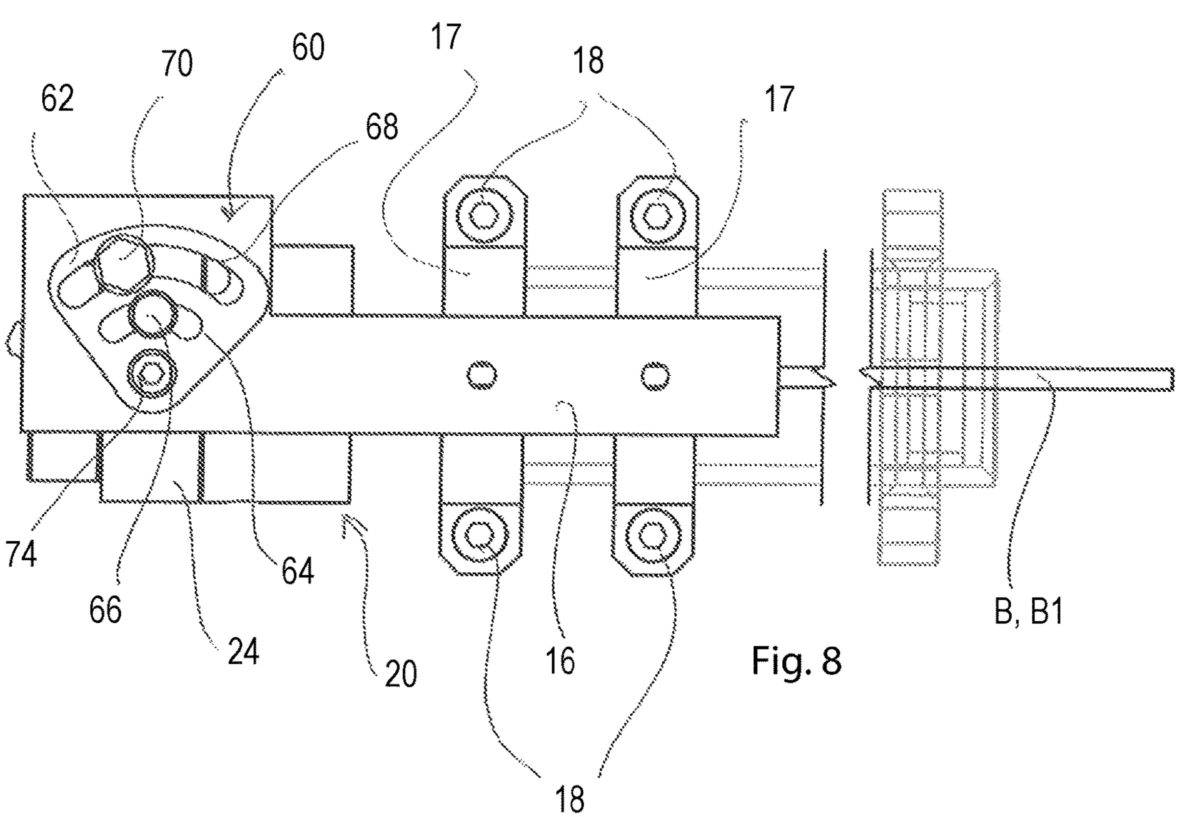
FIG. 8 is a side view of the device in an operating condition.
Figures 9, 10:
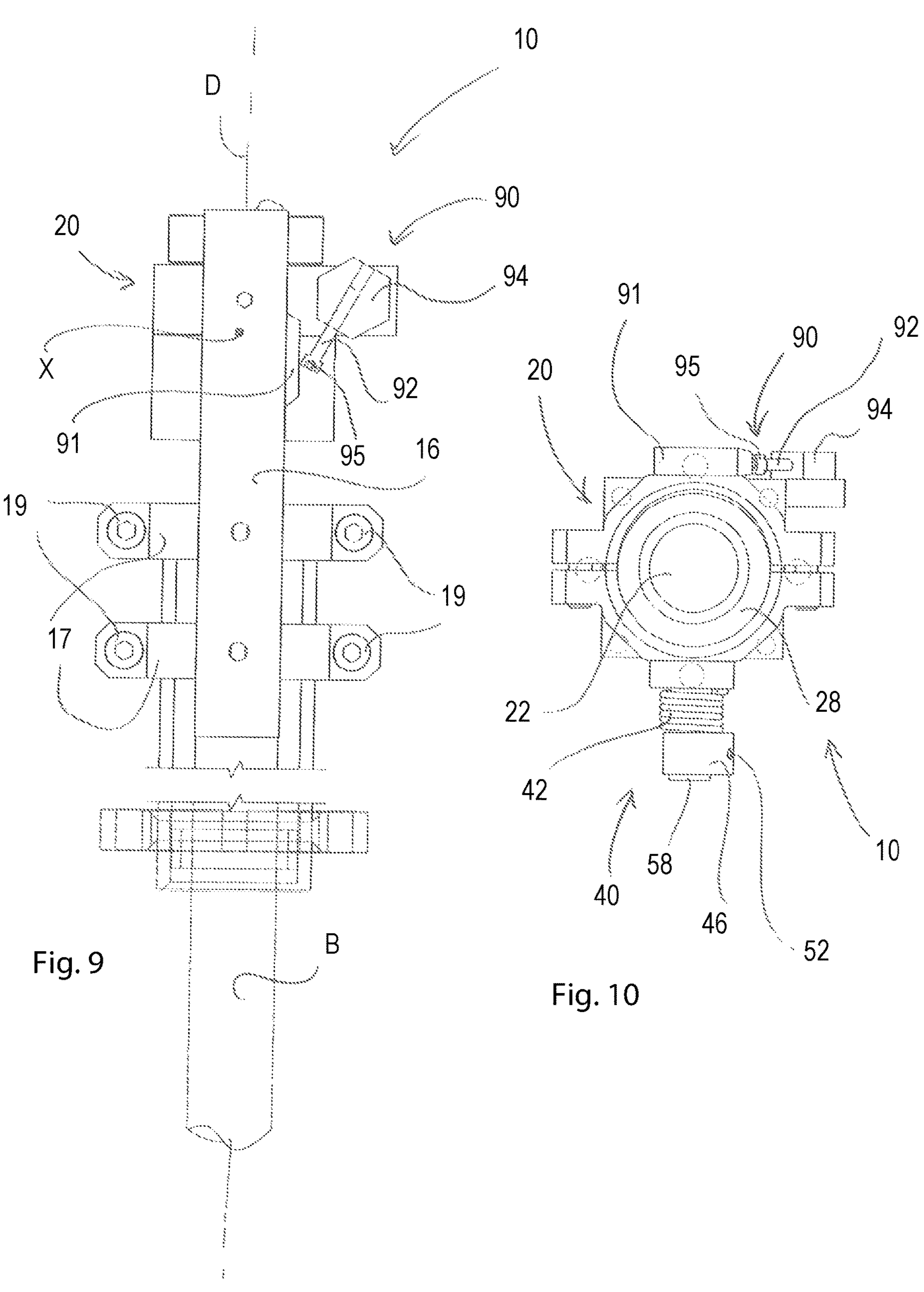
FIG. 9 is a side view of a further embodiment of the device according to the invention.
FIG. 10 is a bottom view of the device shown in FIG. 9.
Figures 11, 12:
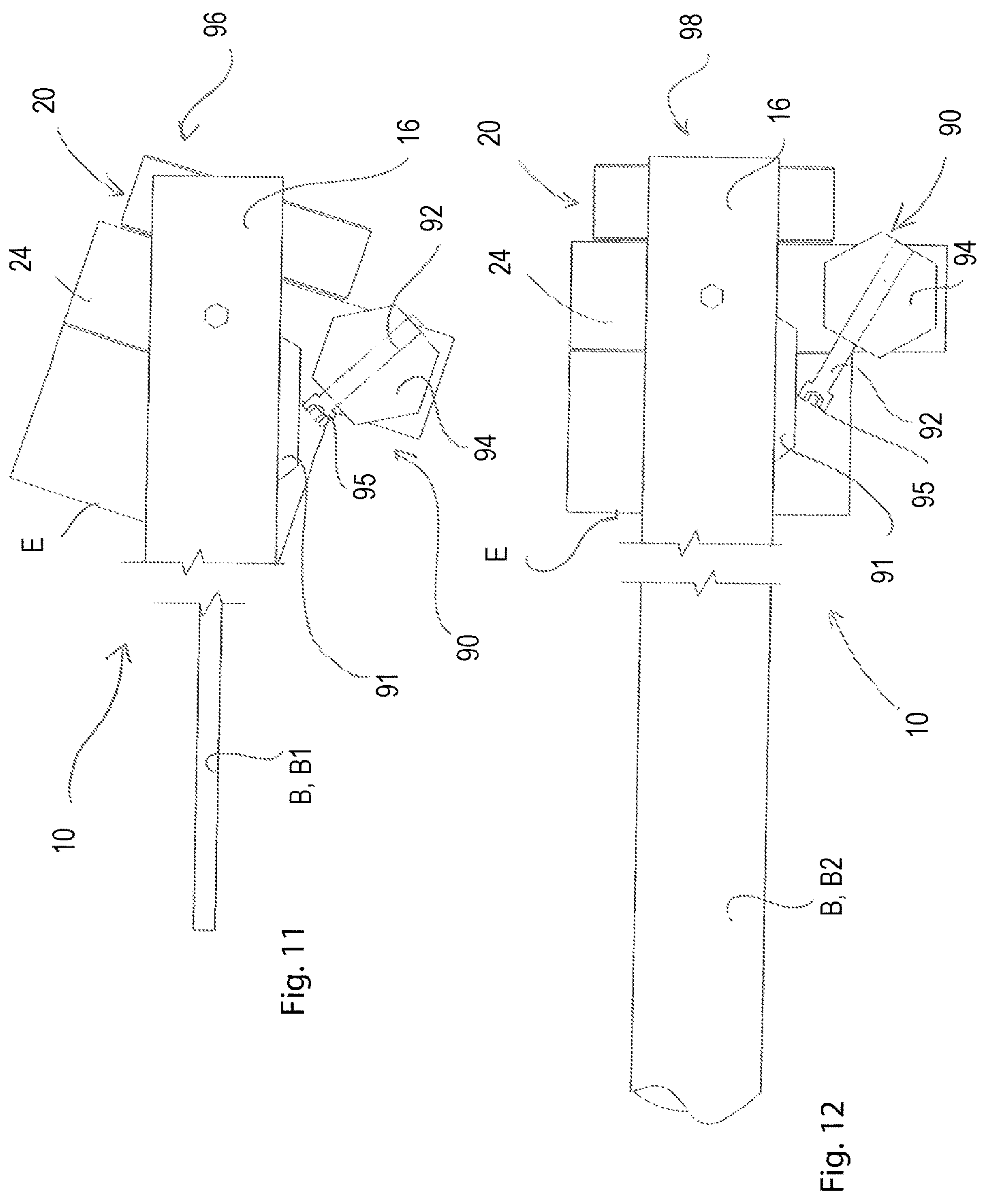
FIG. 11 is an enlarged side view of part of the device of FIG. 9 but in a different operating position.
FIG. 12 is a view that is identical to that in FIG. 11 but with the device in a different operating position corresponding to a bar with greater diameter.

The cursor screw 70 is screwed into a seat 34 obtained on the guide body 20 and is slidable along the sliding and limiting slot 68. The cursor screw 70 is intended to slide, when the bar B,B1,B2 is received in the guide body 20, along the sliding and limiting slot 68 between an initial position, corresponding to the angular rest position 36, as visible in FIG. 5, and a work position 37,38, as visible in FIGS. 6 and 7, in which the guide body 20 is maintained, through the effect of the elastic force of the return member 40, in contact from both sides with the bar B,B1,B2 to exert on the latter the guiding and centring action. The examples of FIGS. 6 and 7 show two different operating conditions of the self-centring device 10, corresponding to bars B1,B2 of different diameter. The suitably set spring element 42 cooperates with the suitably positioned adjusting plate 62, so that the self-centring device 10 adapts to the different operating conditions, in particular to the dimensions of the bars B,B1,B2, so as to firmly maintain the bars B,B1,B2 in the correct position during feeding.

In the case of bars B1 of lesser diameter, the adjusting plate 62 has to be positioned so as to leave a greater sliding space for the cursor screw 70 inside the sliding slot 68. In the case of bars B2 of greater diameter, the adjusting plate 62 has to be positioned so as to leave a lesser sliding space for the cursor screw 70 inside the sliding slot 68.

In a second embodiment shown in FIGS. 9-12, the selector member 90 includes a screw element 92, which engages a nut element 94 integrally coupled and movable together with the guide body 20. The screw element 92 includes an abutting head 91, suitable for coming to rest on an arrest portion 95, obtained on said structure 14,16. The unscrewing rotation of the screw element 92 relatively to the nut element 94 results in a reduction of the oscillation of the guide body 20 around the axis X and in a reduction of the tilt of the guide body 20 with respect to the advancement direction D, so as to adapt to bars B2 of greater diameter, as visible in FIG. 12. On the other hand, a screwing rotation of the screw element 92 relatively to the nut element 94 results in an increase of the oscillation of the guide body 20 around the axis X and in an increase of the tilt of the guide body 20 with respect to the advancement direction D to adapt to bars B1 of lesser diameter, as visible in FIG. 11.

The operation of the self-centring device 10 is now disclosed, with particular reference to feeding of the bars B,B1,B2 to the machine tool. Particularly, attention is paid to the versatility of the self-centring device 10 that has just been disclosed structurally, which results in numerous advantages over prior-art devices.

The bar B,B1,B2 travels the advancement path of tubular shape defined by the support structure 14,16, whilst it is pushed and kept in position by the loading apparatus.

The guide body 20, before the bar B,B1,B2 is received inside the through opening 22, is in a position tilted by an angle α with respect to the advancement direction D, as visible in FIG. 5. The initial tilt of the guide body 20 makes it possible to establish a first point of contact between the bar B,B1,B2 and the guide body 20. Owing to this configuration, the self-centring device 10 is ready to receive also very thin bars, i.e. bars having very small diameters; any risk is thus avoided that bars with very small sections can transit through the guide body 20 without ever intercepting the inner surfaces of the latter. In this case, in fact, the bars would proceed to the machine tool without receiving any control action, with undesired consequences.

Owing to the possibility of setting a correct initial tilt of the guide body 20 with respect to the advancement direction D, on the basis of the diameter of the bars B to be fed to the machine tool, the operating conditions are met each time.

For example, in order to understand better how the dimensions of the bars B influence the operation of the device 10, examples are shown in FIGS. 6-7 of the bars B1 and bars B2 having different diameters. The tilt of the guide body 20 in the case of feeding bars B1 must be greater than in the case of feeding bars B2.

Once a first point of contact between the bar B,B1,B2 and the surface of the through opening 22 is established, the guide body 20 rotates around the axis X until a second point of contact is established therebetween and the bar B,B1,B2. In this manner, the self-centring device 10 performs the function of guiding and centring on the bars B,B1,B2 to be fed to the machine tool, maintaining the bars B,B1,B2 in the correct axial position. The angular position of the guide body 20 with respect to the advancement direction D varies with respect to the diameter of the bar B,B1,B2 being supplied. As is visible from the comparison of FIGS. 6 and 7, the guide body 20 is tilted by an angle α1 in the case of bars B1 having a lesser diameter, α1 being greater than an angle α2 in the case of bars B2 having a greater diameter. As a result, the greater the value of the diameter of the bar B the more the value is approached of the diameter of the through opening 22, the less the guide body 20 is tilted with respect to the advancement direction D. In other words, in the case of bars B2, the guide body 20 is arranged almost parallel to the advancement direction D.

As can be seen from what has been described, the self-centring device 10 enables the objects declared above to be reached. In particular, owing to the invention, a self-centring device 10 is provided that is versatile and easy to use, is able to adapt to the different operating conditions set by production, without contributing to slowing production.

Owing to the synergic action of the return member 40 and of the manual selector member 60;90, the self-centring device according to the invention is able to adapt to the different operating conditions, in particular on the basis of the features of the bars to be loaded onto the machine tool. In particular, the return member 40 and the manual selector member 60;90, that act to control the angular movement of the guide body 20, are simple from the structural and functional point of view, and involve a general reduction of the weights and overall dimensions. Further, manual selection methods, both for preloading of the elastic element and for positioning the selective member, are highly intuitive and easy to set.

Owing to the extremely simplified structural configuration of the self-centring device according to the invention, the level of mechanical reliability of the entire feeding apparatus is also increased.

It is possible to configure and size the device 10 in a desired manner as a function of the applications for which it may be intended, and the materials used for the device 1 can be chosen according to need provided that they are suitable for the specific use for which they are intended. Lastly, versions on and/or additions to what has been disclosed and illustrated in the attached drawings are possible.

The invention claimed is:

1. A self-centring device for supporting and guiding bars to be fed to a machine tool, including:

a guide body having a through opening, supported rotatably and rotating in a controlled manner around an axis perpendicular to an advancement direction of the bars to be guided, so as to vary the angular orientation thereof around said axis, said guide body being configured to receive and maintain in position the rotating and advancing bars, a return member configured to oppose a suitable preselectable resistance to the rotation of said guide body around said axis so as to maintain a firm coupling and contact of said guide body with the advancing bar, wherein said return member comprises an elastic element including a helical torsion spring having a first end being engaged in a stationary manner with a support structure and a second end being operationally connected by a coupling and adjusting arrangement to said guide body, wherein said coupling and adjusting arrangement includes a hollow connecting element and an adjusting arm fitted to said hollow connecting element and configured to select the size of the elastic return force exerted by said torsion spring, on said adjusting arm a coupling seat being obtained for said second end of said spring and a seat housing a releasable fixing and adjusting screw, by which it is possible to adjust the position of said adjusting arm around said hollow connecting element to increase or decrease in a desired manner the recall force exerted by said torsion spring, a manual selector member configured to adjust a position and control the angular movement of said guide body, in which said selector member is fitted to a support structure suitable for being fixed to a bar-feeding apparatus and in which said manual selector member includes a screw arrangement cooperating with an oscillation limiting element to set an angular rest position of said guide body in function of the geometry of the bar to be received and guided to said machine tool, said device being WHEREIN said limiting element included in said selector member includes an adjusting plate applied to said support structure and configured to limit the oscillation of said guide body around said axis, said selector member including a positioning arrangement to adjust the position of, and releasably fix, said adjusting plate with respect to said support structure, a sliding and limiting slot cooperating with a cursor screw connected to and movable with said guide body being obtained on said adjusting plate, to set an angular rest position of said guide body as a function of the geometry of the bar to be received and guided to said machine tool, said sliding and limiting slot setting an end-stroke position for said cursor screw that is variable by modifying the position of said adjusting plate with respect to said support structure by acting on said positioning arrangement.

2. The self-centring device according to claim 1, wherein said guide body includes a support structure shaped to define said through opening intended to permit the transit and the containment of said bars along said advancement direction, said through opening being bounded by flared surfaces obtained at an end of said guide body suitable for receiving said bar, said flared surfaces being confirmed to facilitate the entry and the containment of said bars, said guide body further including anti-friction elements that define at least part of the inner surface that bounds said through opening and configured to reduce the attrition in the reciprocal contact between the bar and the guide body.

3. The self-centring device according to claim 1, wherein said hollow connecting element extends through a through opening obtained in said adjusting arm and through said torsion spring, said hollow connecting element being shaped to couple integrally—by a screw element—with a protrusion of said guide body that engages a seat of said support structure.

4. The self-centring device according to claim 1, wherein said positioning arrangement includes a setting screw suitable for coupling in a stationary manner with a hole obtained on said support structure, and engaging with a setting slot of arched shape obtained on said adjusting plate, said setting slot enabling, once said setting screw has been loosened, the position of said adjusting plate to be loosened in relation to said support structure.

5. The self-centring device according to claim 1, wherein said cursor screw, slidable along said sliding and limiting slot, is screwed into a seat obtained on said guide body, said cursor screw being designed to slide, when said bar is received in said guide body, along said sliding and limiting slot between an initial position, corresponding to said angular rest position and a work position in which said guide body is maintained, through the effect of the elastic force of said return member, in contact on two sides with said bar to exert on the latter the guiding and centring action.

6. The self-centring device according to claim 1, wherein said adjusting plate is hinged on said support structure by a screw element engaging a respective hole.

7. The self-centring device according to claim 1, wherein said selector member includes a screw element engaging a nut element that is integrally coupled with and movable together with said guide body, said screw element includes an abutting head suitable for coming to rest on a rest portion obtained on said structure, an unscrewing rotation for unscrewing said screw element relatively to said nut element resulting in a reduction of the oscillation of said guide body around said axis and a reduction of the tilt of said guide body with respect to said advancement direction to adapt to bars of greater diameter, a screwing rotation for screwing said screw element relatively to said nut element, resulting in an increase in the oscillation of said guide body around said axis and resulting in an increase of the tilt of said guide body with respect to said advancement direction to adapt to bars of lesser diameter.

8. The self-centring device according to claim 1, wherein said guide body, said return member and said selector member are fitted to said support structure, said support structure consisting of a first rod and a second rod, configured to couple reciprocally by screw members engaging respective holes, said first rod and second rod being of semicircular shaped so as to bound a tubular zone along which said bar is designed to advance.

* * * * *